Figure 1:
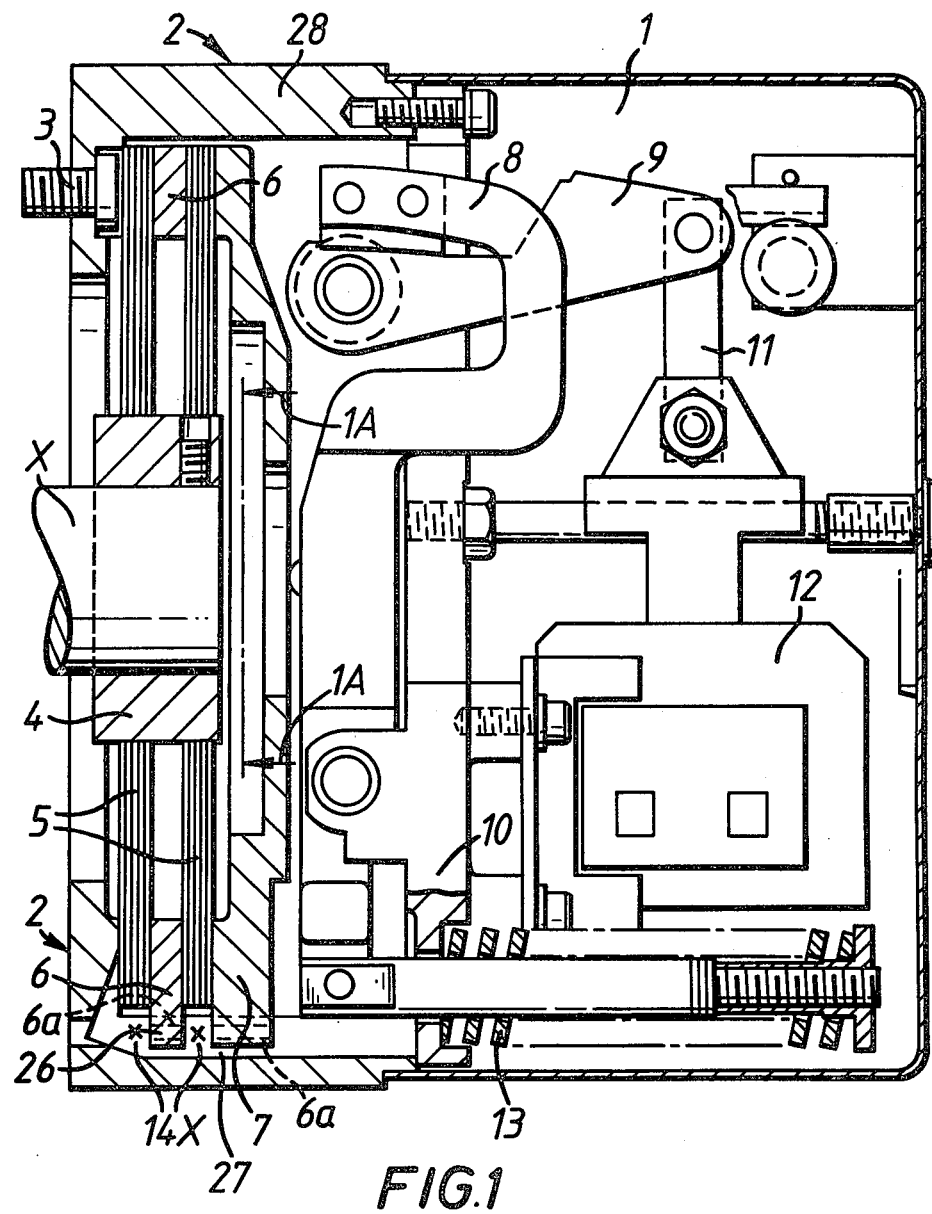

United States Patent [19]

Walton et al.

[11] 4,362,227
[45] Dec. 7, 1982

[54] CLUTCHES AND BRAKES

[75] Inventors: John M. Walton; Anthony H. Mather, both of Greater Manchester, England

[73] Assignee: Stone-Platt Oldham Limited, Greater Manchester, England

[21] Appl. No.: 198,177

[22] Filed: Oct. 17, 1980

[30] Foreign Application Priority Data

Nov. 1, 1979 [GB] United Kingdom ................. 7937890

[51] Int. Cl.³ ...................... F16D 13/56; F16D 55/38
[52] U.S. Cl. ................................. 192/70.28; 188/72.3
[58] Field of Search ................... 192/70.28; 188/72.3, 188/216

[56] References Cited

U.S. PATENT DOCUMENTS

| 3,175,664 | 3/1965 | Ramsel | 192/70.28 |
| 3,584,720 | 6/1971 | Bark | 192/70.28 |
| 3,863,038 | 1/1975 | Kreitner et al. | 188/72.3 X |

FOREIGN PATENT DOCUMENTS

| 316017 | 3/1934 | Italy | 192/70.28 |
| 404971 | 3/1974 | U.S.S.R. | 192/70.28 |

Primary Examiner—Allan D. Herrmann

Attorney, Agent, or Firm—Strimbeck, Davis & Soloway

[57] ABSTRACT

A clutch or brake assembly in which a hub and reaction member are, in the operative condition of the clutch or brake, coupled together through coupling discs, has one or a plurality of first coupling discs restrained against rotation relative to the reaction member and displaceable relatively thereto axially of the hub, so that it or they can be moved into engagement with one or more second coupling discs, e.g. friction discs, mounted for rotation with the hub to render the clutch or brake operative. The or each first coupling disc is located axially relatively to the reaction member in the inoperative condition of the clutch or brake by a set of spring members mounted directly on the coupling disc through a frictional gripping engagement. Where a plurality of the first coupling discs and a corresponding number of spring sets are used, the spring members of one set interconnect with the spring members of the adjacent set. This can be achieved by providing holes in each of the first coupling discs, in each of which holes a loop portion of a spring member frictionally engages, the loop portion extending through and beyond the hole in which it is located to interconnect with a spring member of the adjacent set.

4 Claims, 5 Drawing Figures

CLUTCHES AND BRAKES

This invention relates to clutch and brake assemblies which may for example be applied to the armature shaft of an electric motor.

In assemblies of this general type one brake assembly is known as a "motor brake" and is of the electromagnetically releasable kind. This brake assembly is normally mounted on an electric motor casing at a shaft end thereof. This brake assembly is connected electrically in series or in parallel with the electric motor to release the brake when the motor is energised and to apply the brake whenever the motor is deenergised. When mounting a motor brake assembly to apparatus such as for example a drilling machine, the assembly can be positioned in a horizontal or a vertical plane depending upon the mounting of the motor. Other positioning is possible but usually either a horizontal or a vertical position is used. This brake assembly comprises an end plate, rotatable friction discs interspersed with non-rotating discs and a pressure plate to apply the braking action. Pins and springs locate and separate the non-rotating discs from the friction discs to prevent overheating by frictional engagement between the discs, particularly in vertical assemblies. When it becomes necessary to service such an assembly or replace worn parts the brake is usually dismantled and reassembled in situ. When servicing a brake as so described the end plate, friction discs, stationary discs, pressure plate, springs and pins are very difficult to position especially when the brake is located below the motor in a vertical assembly. All the parts must be assembled sequentially and held up in position while, for example, the pins and springs which separate the stationary discs are put in place. This is a difficult and time consuming operation which our invention seeks to overcome.

According to one aspect of the invention we provide a clutch or brake assembly comprising:
a. a hub adapted to be mounted on a rotatable shaft for rotation therewith,
b. a reaction member which in the operative condition of the clutch or brake becomes coupled to the hub to prevent or inhibit relative rotation therebetween,
c. a first coupling disc located so that it is restrained against rotation relative to the reaction member and is displaceable axially of the hub relatively to the reaction member,
d. a second coupling disc mounted on the hub so that it is fixed for rotation with the hub, and
e. actuating means for rendering the clutch or brake operative by applying an axial force to cause frictional engagement between the coupling discs,
characterised in that said first coupling disc is, in the inoperative condition of the clutch or brake, located axially relatively to the reaction member by a set of spring members mounted directly on said first coupling disc through a frictional gripping engagement between each spring member and said first coupling disc.

Since the spring members are mounted directly on said first coupling disc, the use of pins as in the known assembly described above is obviated and the spring members can be mounted on the first coupling disc prior to fitting the coupling disc into the assembly.

According to a second aspect of the invention we provide a clutch or brake assembly comprising:
a. a hub adapted to be mounted on a rotatable shaft for rotation therewith,
b. a reaction member which in the operative condition of the clutch or brake becomes coupled to the hub to prevent or inhibit relative rotation therebetween,
c. a plurality of first coupling discs located so that they are restrained against rotation relative to the reaction member and displaceable axially of the hub relatively to the reaction member,
d. a second coupling disc disposed between each adjacent pair of first coupling discs and mounted on the hub so that it is fixed for rotation with the hub and displaceable axially relatively to the hub, and
e. actuating means for rendering the clutch or brake operative by applying an axial force to cause frictional engagement between the coupling discs,
characterised in that said first coupling discs are each, in the operative condition of the clutch or brake, located axially relatively to the reaction member and to each other by sets of spring members, each set of spring members being mounted on a respective one of said first coupling discs through a frictional gripping engagement between each spring member and said coupling disc.

In a preferred embodiment, each of said first coupling discs has a plurality of locating holes passing through it, and a locating portion of each spring member is arranged to frictionally engage in a respective one of the locating holes.

Preferably the locating portion of the spring is an integrally formed loop portion shaped so that it frictionally engages with the wall of the hole in which it locates.

Preferably said loop portions of one set of spring members extend through and beyond the holes in which they are located and interconnect with a respective spring member of the adjacent set.

Preferably each said spring member comprises a coiled spring portion and said loop portion which extends in a plane transverse to the planes of the coils of said coiled spring portion, said loop portions of the spring members of one set interconnecting with the spring members of the adjacent set by extending into the coils of the coiled spring portions of said adjacent set of spring members.

Figure 2:
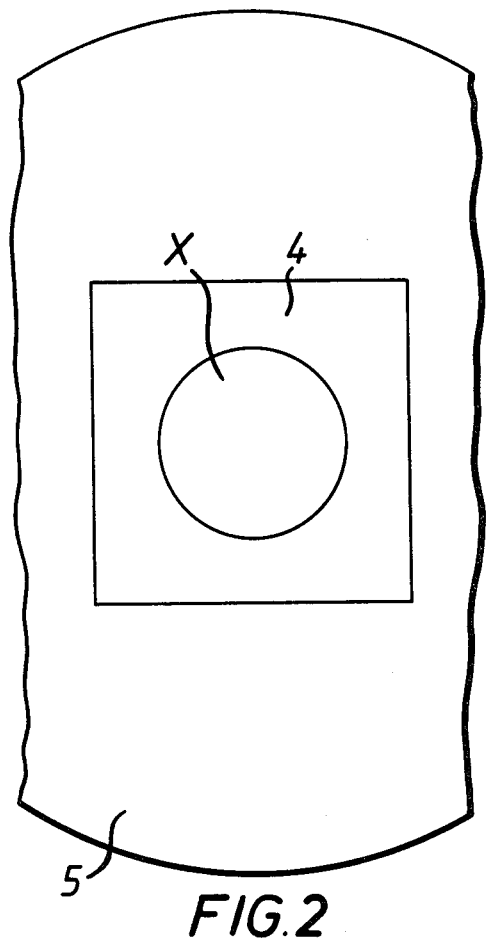
Figure 3:
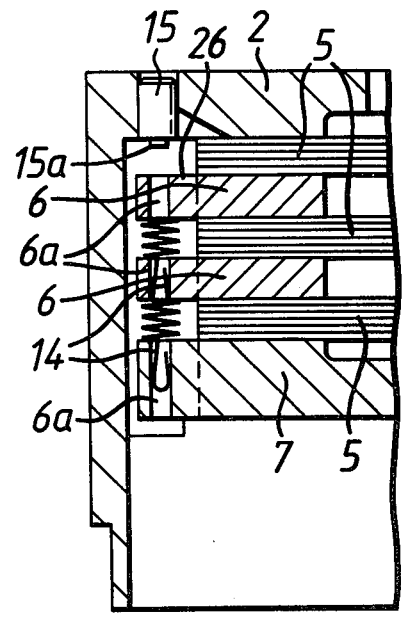
Figure 5:
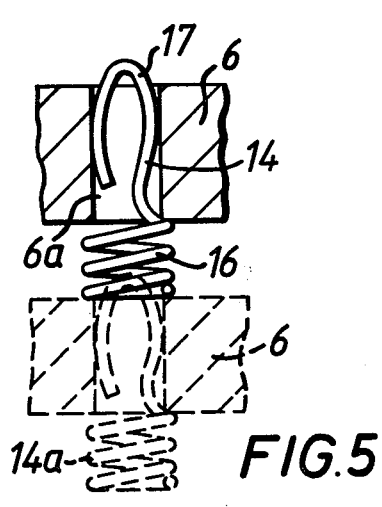
Figure 4:
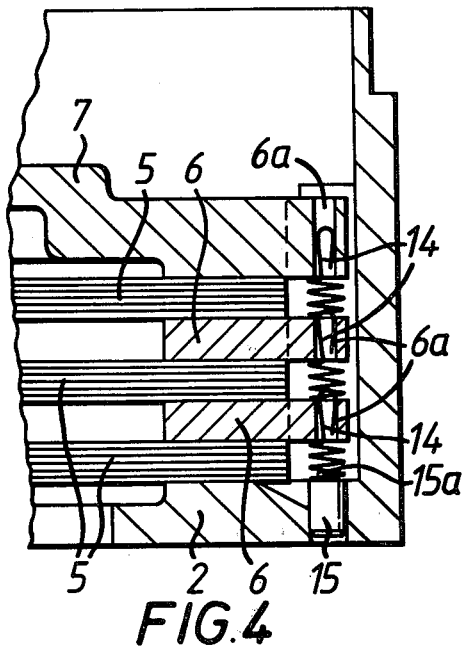

The invention will now be described in more detail and by way of example with reference to the accompanying drawings in which:

FIG. 1 is a part cross sectional elevation of a horizontal motor brake assembly in which two friction discs are shown, FIG. 2 is a sectional view on FIG. 1, FIG. 3 is a part sectional elevation showing a similar brake assembly where the brake is mounted below the motor in a vertical plane, three friction discs being shown, FIG. 4 is a similar part sectional elevation showing a brake assembly where the brake is mounted above the motor in a vertical plane, and FIG. 5 is an enlarged view of one locating spring with a second spring in dotted profile.

In the embodiments shown in FIGS. 1, 3 and 4 respectively the construction of the actual brake assembly is identical except for the number of friction discs and associated parts used and the disposition of the brake assembly. The embodiments will therefore be described collectively using the same reference numberals in the different embodiments to designate corresponding parts.

With reference to the drawings the brake assembly 1 comprises a reaction member in the form of an end plate 2 through which pass suitable mounting screws 3, (one shown). On the motor shaft X is mounted a hub 4 which is of square section (as shown in FIG. 2) and carries a number of coupling discs in the form of friction discs 5 which have a square aperture so as to fit in sliding location on the hub 4. Stationary, i.e. non-rotating, annular coupling discs 6 are interspersed with and separate the friction discs 5. The discs 6 are each keyed to the end plate 2 and hence to the casing of the motor brake such that axial movement is possible but turning movement about the axis is prevented. This keying is effected by providing each disc 6 with three peripheral lugs 26 spaced at 120° to each other, only one of which is visible in the drawings. Each of these lugs locates in a respective groove 27 formed on the inside surface of the annular wall portion 28 of the end plate 2 and extending axially of the motor shaft X. A further coupling disc in the form of a pressure plate 7 restrained against rotation by lugs similarly to the discs 6, operates in co-operation with a lever and roller arrangement 8, 9, 10 and 11, and a solenoid 12 for releasing braking pressure applied by three springs 13 (only one visible). The lugs 26 of the stationary discs 6 and the pressure plate 7 are provided with a plurality of holes 6a for receiving a number of locating springs 14 which are thus spaced angularly around the axis of the motor shaft X and locate and separate the braking parts as hereafter described and allow the friction discs 5 to rotate in the inoperative condition of the brake. The springs 14 are positioned between the pressure plate 7 and the adjacent stationary disc 6, between each pair of adjacent stationary discs 6 and also between the last stationary disc 6 and the end plate 2. In FIG. 1 the positioning of the springs 14 is indicated diagrammatically at 14X. As best shown in FIG. 5 each of the locating springs 14 comprises a single length of wire forming a coiled spring portion 16 and a locating loop portion 17 extending in a plane at right angles to the planes of the coils of the portion 16. The dimensions of each spring are such that on assembly the loop portion 17 engages within the coil portion 16 of an adjacent spring, as will hereinafter be described.

During assembly of the braking arrangement described above (see FIGS. 1 and 4) the end plate 2 is bolted to the motor casing (not shown) and the hub 4 secured to the motor shaft X. A friction disc 5 is then located over the hub 4 followed by a stationary disc 6 which has a first set of springs 14 mounted on it. To mount the springs 14 on the disc 6 the loop portions 17 of the springs 14 are pressed into the holes 6a in frictional gripping engagement with the walls of the holes 6a. The loop portions 17 pass through the holes 6a and protrude by approximately 20% of their length beyond the holes 6a. The coiled portions 16 of the first set of springs 14 locate on the spring locating pins 15 (one shown) over projecting pin nose 15a. To clearly show the pin nose 15a this first set of springs 14 has been omitted from the view of FIG. 3.

A further friction disc 5 is then located as described above followed by a further stationary disc 6 provided with a second set of springs 14 located by a frictional gripping engagement in the holes 6a. It is a simple matter to position the further stationary disc 6 by locating each coiled portion 16 of the second set of springs 14 over the loop portions 17 of the springs 14 already assembled on the first stationary disc 6. Greater detail of spring location is shown in FIGS. 4. This assembly procedure is continued until the desired number of friction discs 5 and stationary discs 6 are in position. Finally the pressure plate 7 with a set of springs 14 mounted on it is similarly located in position with the coiled portions 16 of its set of springs locating over the loop portions 17 of the set of springs mounted on the adjacent stationary disc 6. It will be appreciated that the above method of assembling a brake is time saving and efficient. It is also an improved assembling procedure over the conventional system of using pins and springs to locate and separate the stationary discs.

In the simplest embodiment of the invention (not shown in the drawings), the brake assembly uses only the pressure plate 7 as a coupling disc and a single friction disc, which is disposed between the end plate 2 and the pressure plate 7. A single set of the springs 14 is therefore used each of which at one end abuts the end plate 2 and has its loop portion passing through one of the holes 6a in the pressure plate 7 and frictionally engaging in the hole.

It will be readily appreciated by persons skilled in the art that the brake assemblies described above can be readily adapted to act as a clutch assembly simply by fixing the end plate 2 to a driven member rather than to the stationary motor casing so that the end plate constitutes a driven member.

We claim:
1. A clutch or brake assembly comprising:
    a. A hub adapted to be mounted on a rotatable shaft for rotation therewith,
    b. a reaction member which in the operative condition of the clutch or brake becomes coupled to the hub to prevent or inhibit relative rotation therebetween.
    c. a first coupling disc located so that it is restrained against rotation relative to the reaction member and is displaceable axially of the hub relatively to the reaction member and having a plurality of holes extending through it,
    d. a set of spring members by means of which said first coupling disc is, in the inoperative condition of the clutch or brake, located axially relatively to the reaction member, each spring member having an integrally formed loop portion which locates in a respective one of the holes in said first coupling disc and which is so shaped that it frictionally engages the wall of the hole in which it locates to mount the spring member directly on said first coupling disc.
    e. a second coupling disc mounted on the hub so that it is fixed for rotation with the hub, and
    f. actuating means for rendering the clutch or brake operative by applying an axial force to cause frictional engagement between the coupling discs.
2. A clutch or brake assembly comprising:
    a. a hub adapted to be mounted on a rotatable shaft for rotation therewith,
    b. a reaction member which in the operative condition of the clutch or brake becomes coupled to the hub to prevent or inhibit relative rotation therebetween.
    c. a plurality of first coupling discs located so that they are restrained against rotation relative to the reaction member and displaceable axially of the hub relatively to the reaction member each of said first coupling discs having a plurality of holes extending through it, d. a plurality of sets of spring members by means of which said first coupling discs are, in the inoperative condition of the clutch or brake, located axially relatively to the reaction member and to each other, each set of spring members being mounted on a respective one of said first coupling discs, the spring members of each set each having an integrally formed loop portion which locates in a respective one of the holes in the first coupling disc and which is so shaped that it frictionally engages the wall of the hole in which it locates to mount the spring member on the first coupling disc.

e. a second coupling disc disposed between each adjacent pair of first coupling discs and mounted on the hub so that it is fixed for rotation with the hub and displaceable axially relatively to the hub, and f. actuating means for rendering the clutch or brake operative by applying an axial force to cause frictional engagement between the coupling discs.

3. A clutch or brake according to claim 2, wherein said loop portions of one set of spring members extend through and beyond the holes in which they are located and interconnect with a respective spring member of the adjacent set.

4. A clutch or brake according to claim 3, wherein each said spring member comprises a coiled spring portion and said loop portion which extends in a plane transverse to the planes of the coils of said coiled spring portion, said loop portions of the spring members of one set interconnecting with the spring members of the adjacent set by extending into the coils of the coiled spring portions of said adjacent set of spring members.

* * * * *